United States Patent
Waku et al.

(10) Patent No.: US 6,293,603 B1
(45) Date of Patent: Sep. 25, 2001

(54) VEHICULAR SEAT

(75) Inventors: Seiji Waku; Hiroyuki Isayama; Hiroaki Taniguchi, all of Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/412,573

(22) Filed: Oct. 5, 1999

(30) Foreign Application Priority Data

Oct. 5, 1998 (JP) .................................................. 10-283106
Oct. 5, 1998 (JP) .................................................. 10-283107

(51) Int. Cl.[7] .............................. B60N 2/02; B60N 2/04; B60N 2/10; B60N 2/30
(52) U.S. Cl. ..................................... 296/65.09; 296/65.05; 296/69; 297/334; 297/335; 297/336; 297/341
(58) Field of Search .............................. 296/65.06, 65.09, 296/66, 69; 297/334, 335, 336, 341

(56) References Cited

U.S. PATENT DOCUMENTS

| | | | |
|---|---|---|---|
| 3,328,069 | * | 6/1967 | Dumas .................................. 296/65 |
| 4,736,985 | * | 4/1988 | Fourrey et al. ....................... 297/331 |
| 4,979,773 | * | 12/1990 | Eubank ................................ 296/65.1 |
| 5,482,349 | * | 1/1996 | Richter et al. .......................... 297/15 |
| 5,570,931 | * | 11/1996 | Kargilis ............................ 297/378.12 |
| 5,662,368 | * | 9/1997 | Ito et al. ............................. 296/65.1 |
| 5,795,023 | * | 8/1998 | Kayumi ................................ 297/331 |
| 5,957,522 | * | 9/1999 | Matsuhashi et al. ................... 296/66 |
| 5,988,726 | * | 11/1999 | Onoda et al. ...................... 296/65.05 |

FOREIGN PATENT DOCUMENTS

003643729A1 * 7/1988 (DE) ..................................... 297/341

* cited by examiner

Primary Examiner—D. Glenn Dayoan
Assistant Examiner—Greg Blankenship
(74) Attorney, Agent, or Firm—Sughrue, Mion, Zinn, Macpeak & Seas, PLLC (57) ABSTRACT

In a vehicular seat 10A in which a link 15 which is rotatably fixed to a floor 9 is connected to a seat frame 21 at one end thereof for guiding the vehicular seat 10A for movement from an in-use state to a received state and vice versa, a rotation restraining member 17 is provided in such a manner as to extend between the floor 9 and the seat frame 21 for restraining the vehicular seat 10A, which has reached the received state from the in-use state, from further rotating about the link 15 by virtue of the action of inertia.

6 Claims, 11 Drawing Sheets

VEHICULAR SEAT

BACKGROUND OF THE INVENTION

1. Field of the Invention

The present invention relates to a vehicular seat such as a rear seat for a vehicle.

2. Description of the Related Art

FIGS. 10A to 10E are side views of a related vehicular seat. Specifically, a retractable rear seat 100 is shown as one example of a vehicular seat.

Figure 10A:
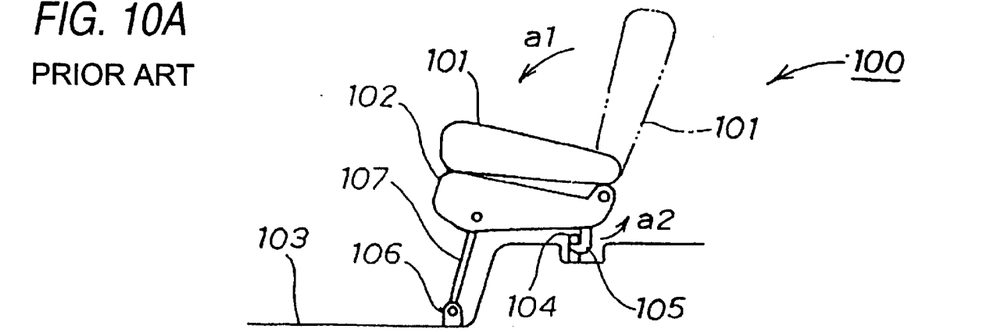
FIGS. 10A to 10E are side views of a related vehicular eat.

In FIG. 10A, a seat back 101 of the rear seat 100, which is in an in-use state, is folded down toward a seat cushion 102 as indicated by an arrow a1, and a hook 105 provided on the seat cushion 102 is released from a hook retaining member 104 provided on a floor 103 side.

Figures 10B, 10C:
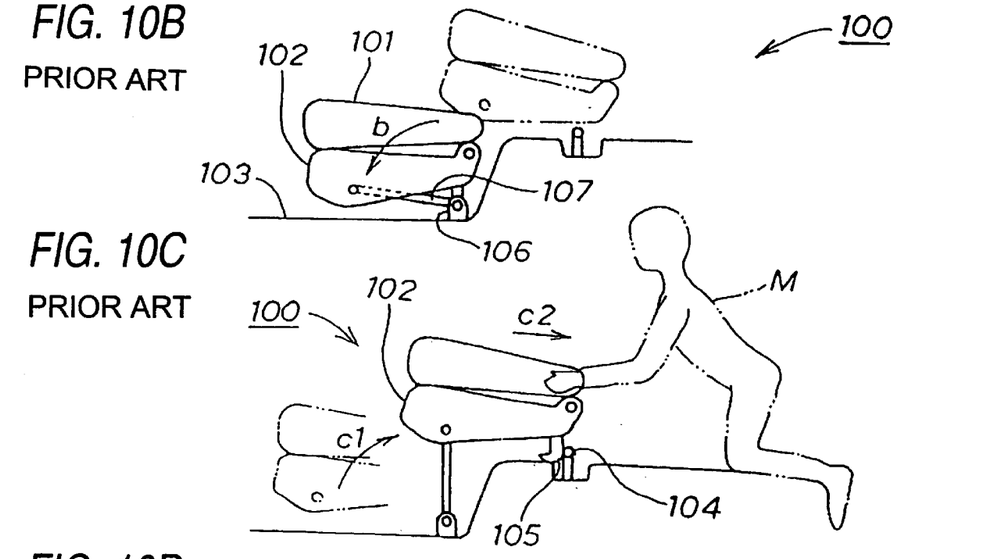

In FIG. 10B, a stay 106 is attached to the floor 103. A link 107 is rotatably attached to the stay 106 at one end thereof and it is also rotatably attached to a seat cushion 102 side at the other end of thereof. The folded seat 100 is rotated as indicated by an arrow b about the one end of the link 107, so that it is received in the floor 103. That is, the rear seat is put in a received state.

In FIG. 10C, the rear seat 100 in the received state is lifted up as indicated by an arrow c1 and then pulled as indicated by an arrow c2.

Figure 10D:
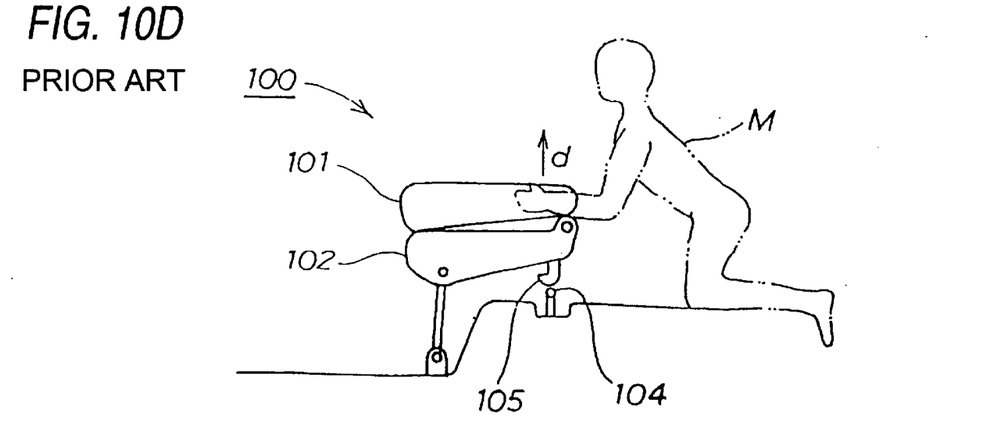

In FIG. 10D, the folded rear seat 100 is further lifted up as indicated by an arrow d and then lowered toward the hook retaining member 104, the hook 105 being hooked on the hook retaining member 104.

As shown in FIG. 10C, since the hook 105 is located below the seat cushion 102, the hook 105 is hard to be seen by an operator M, and therefore there is caused a risk in which the hook 105 is erroneously judged as being hooked on the hook retaining member 104 when the hook 105 is brought into abutment with the hook retaining member 104.

In addition, as shown in FIG. 10D, in view of the fact that an operation is carried out inside a vehicle (not shown), it is hard work to lift up the folded seat 100 as indicated by the arrow d when the hook 105 is tried to be hooked on the hook retaining member 104, and therefore it is desired that the hook 105 can be hooked on the hook retaining member 104 without the necessity of lifting up the rear seat 100.

Figure 10E:
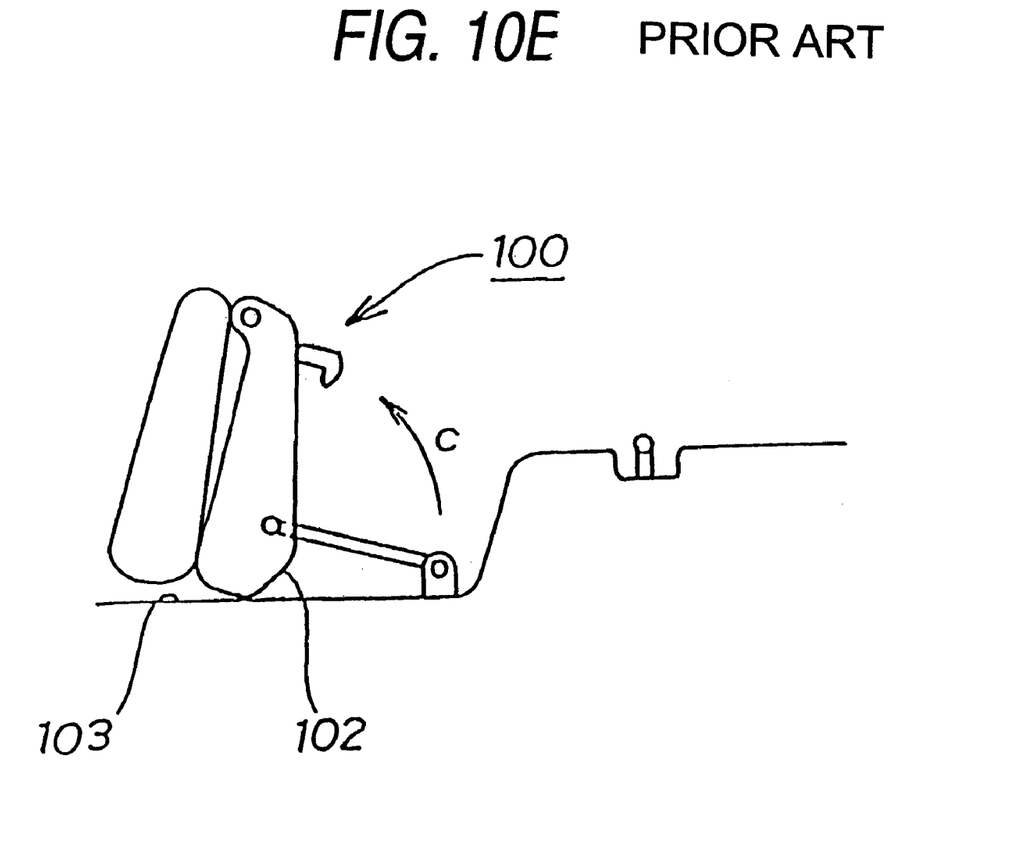

Moreover, as shown in FIG. 10E, since the folded rear seat 100 happens to abruptly spring back as indicated by an arrow e by virtue of the inertia of a vehicle (not shown), a fixing means (not shown) is needed to fix the seat cushion to the floor 103 side in the received state.

However, if a fixing means (not shown) is provided in order to prevent the folded rear seat 100 from springing back, the fixing means has to be released when the folded rear seat is returned from the received state to the in-use state, this providing inconvenience in utilization of the rear seat.

Work to return the folded rear seat 100 from the received state to the in-use state involves work to lift up the folded rear seat 100, and in view of the fact that such work is carried out inside the vehicle (not shown), it is desired that the rear seat be returned from the received state to the in-use state without carrying out any work such as work to release the fixing means.

SUMMARY OF THE INVENTION

To cope with these problems, it is an object of the present invention to provide a vehicular seat that can securely and easily be fastened to a floor side. Further, it is another object of the present invention to provide a vehicular seat that can automatically prevent the vehicular seat from springing back when it is moved from an in-use state to a received state and which allows the vehicular seat to be returned form the received state to the in-use state without carrying out any operation to release the spring-back prevention mechanism.

With a view to attaining the above object, there is provided a vehicular seat in which a link which is rotatably fixed to a floor is connected to a seat frame at one end thereof for guiding the vehicular seat for movement from an in-use state to a received state and vice versa. The vehicular seat includes a rotation restraining member provided in such a manner as to extend between the floor and the seat frame for restraining the vehicular seat, which has reached the received state from the in-use state, from further rotating about the link by virtue of the action of inertia.

The rotation restraining member is provided so as to extend between the floor and the frame for restraining the vehicular seat by restraining therewith the rotation of the vehicular seat about the one end of the link.

With a view to attaining the another object, there is provided a vehicular seat including a link connecting a seat frame to a floor and adapted to be guided by said link so as to be moved from an in-use state to a received state and vice versa after a hook on a seat frame side is separated from locking means on a floor side, wherein an inclined surface is provided on the floor side which allows a lower end of the hook to be matched substantially to the height of an upper surface of the locking means when the vehicular seat is returned from a received state to an in-use state.

In returning the vehicular seat from the received state back to the in-use state, when the hook is slid at a lower end thereof along the inclined surface, pulled up to just before the locking means, and further pulled rearward, the vehicular seat is allowed to be lowered by its own weight, whereby the hook is hooked on the locking means.

When the hook is hooked on the locking means, since the vehicular seat does not have to be lifted up and then lowered, the locking means is easily be hooked by the hook. In addition, since the vehicular seat only has to be pulled rearward to be hooked on the locking means, the hook can securely be hooked on the locking means.

DETAILED DESCRIPTION OF THE PREFERRED EMBODIMENT

Referring to the accompanying drawings, a mode of operation of the present invention will be described. In description, "front", "rear", "left", "right", "up" and "down" indicate, respectively, directions as viewed from the driver, and Fr, Rr, L and R indicates, respectively, front side, rear side, left-hand side and right-hand side. Furthermore, the drawings should be viewed in directions as oriented by reference numerals.

Figure 1:
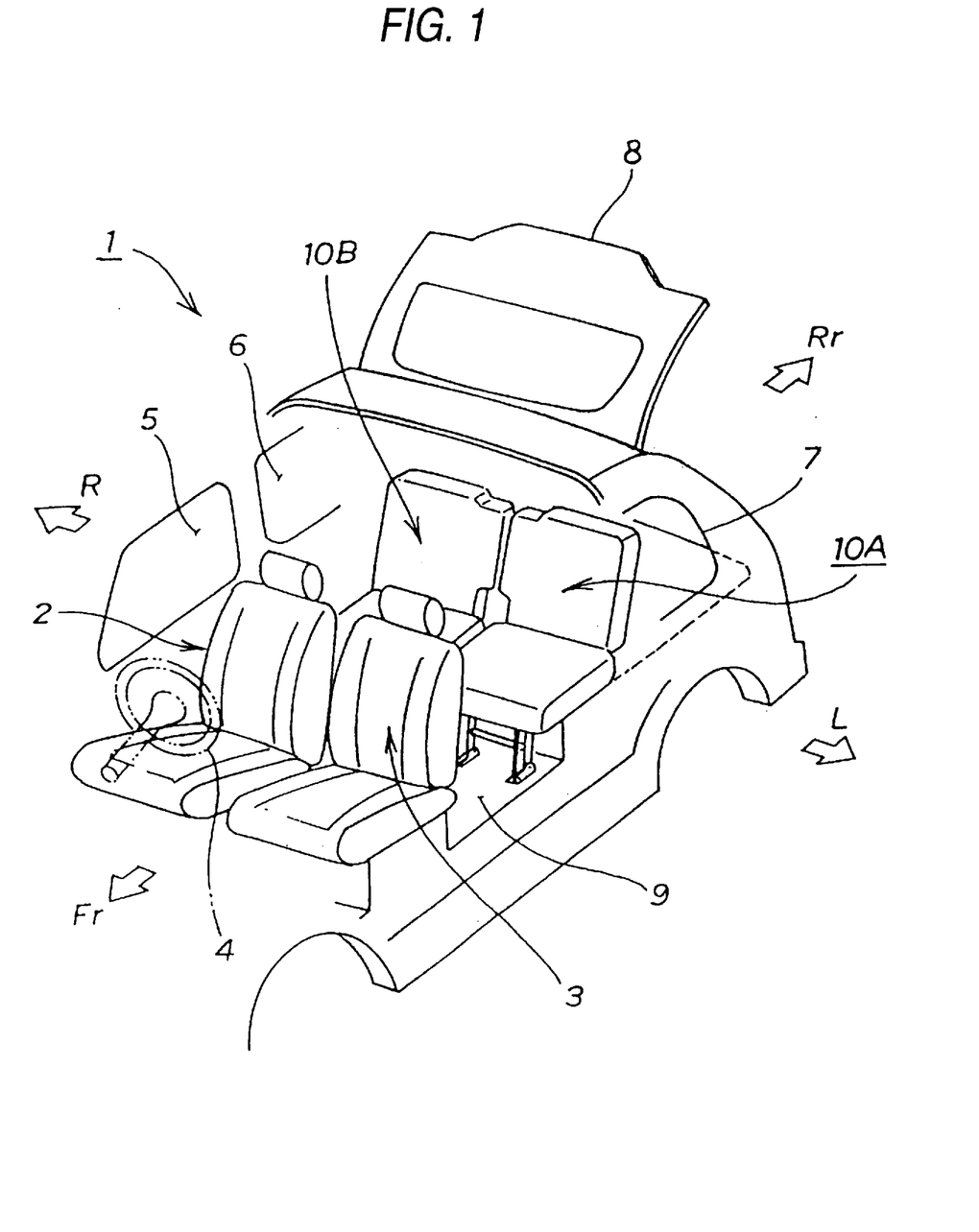
FIG. 1 is a perspective view of an automobile having a vehicular seat according to the present invention installed therein.

FIG. 1 is a perspective view of a vehicle in which a vehicular seat according to the present invention is installed.

The vehicle 1 includes a driver's seat 2, a front passenger seat 3 disposed adjacent to this driver's seat and rear seats 10A, 10B as a vehicular seat disposed behind those seats 2, 3.

Reference numerals 4, 5, 6, 7, 8 and 9 denote steering wheel, front right-hand side window glass, rear right-hand side window glass, rear left-hand side window glass, tail gate and floor, respectively.

Figure 2:
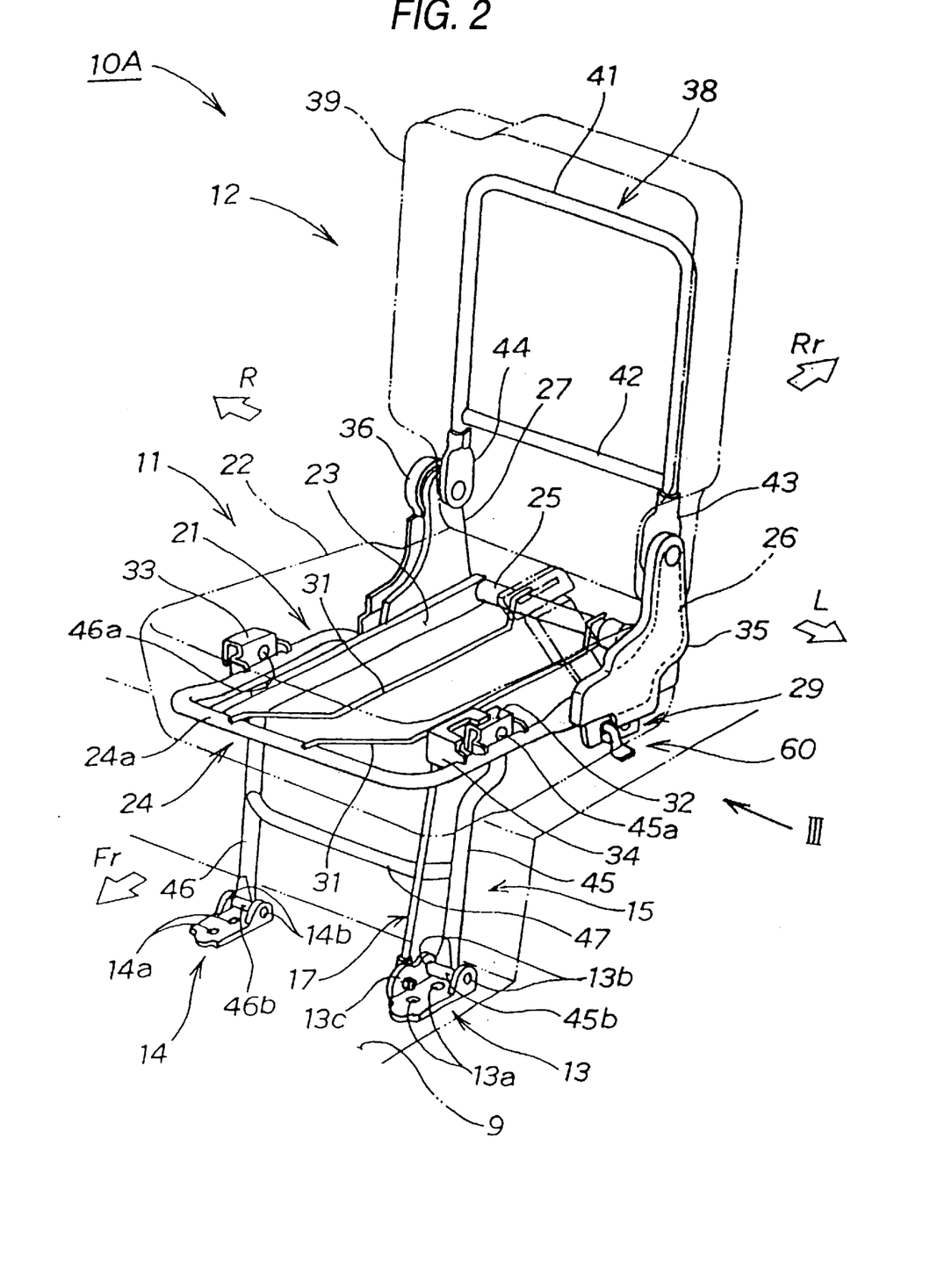
FIG. 2 is a perspective view of the vehicular seat according to the present invention.

FIG. 2 is a perspective view of the vehicular seat according to the present invention.

The rear seat 10A includes a seat cushion 11, a seat back 12 provided on the seat cushion 11 in such a manner as to be folded, left and right support stays, 13, 14 mounted on the floor 9, a seat leg 15 provided as a link for connecting the left and right support stays 13, 14 with the seat cushion 11, a rod 17 as a rotation restraining member interposed between the seat cushion 11 and the left support stay 13, and a seat support structure portion 60 formed in the floor 9. Further, in the embodiment, as shown in FIG. 2, the rod 17 acting as the rotation restraining member is disposed substantially in parallel with the seat leg 15 acting as the link, but they are not necessarily disposed substantially in parallel with each other, and the seat leg 15 may not be in parallel with the link. In addition, the rotation restraining member is disposed before the link, but the member is not necessarily disposed therebefore, and the rotation restraining member may be provided rearward of the link.

In addition, a rear seat 10B shown in FIG. 1 is symmetrical with the rear seat 10A with the respect to a fore and aft direction of the vehicle, and therefore a detailed description thereof will be omitted.

The seat cushion 11 includes a cushion side frame 21 as a seat frame and a cushion 22 covered over this cushion side frame 21.

The cushion side frame 21 is constructed by attaching a right-hand side of a U-shaped portion 24a of a substantially U-shaped pipe 24 to one end of a main frame 23, attaching the substantially U-shaped pipe 24 to an intermediate portion of the main frame 23 at one end thereof, connecting the other end of the substantially U-shaped pipe 24 with the other end of the main frame 23 by a rear pipe 25, attaching a left stay portion 26 to the other end side of the substantially U-shaped pipe 24, attaching a right stay portion 27 to the other end of the main frame 23, attaching a hook 29 below the other end side of the substantially U-shaped pipe 24, providing seat receiving members 31, 31 in such a manner as to extend between the U-shaped portion 24a of the substantially U-shaped pipe 24 and the rear pipe 25, attaching left and right leg support portions 32, 33 to the substantially U-shaped pipe 24, and attaching a rod support portion 34 on a left-hand side of the substantially U-shaped pipe 24. Reference numerals 35 and 36 denote a left cover and a right cover, respectively.

The seat back 12 has a back frame 38 and a back cushion 39 attached to the back frame 38.

The back frame 38 includes a U-shaped pipe, which is connected to each other with an intermediate pipe 42 in the vicinity of ends thereof, and left and right connecting portions 43, 44 are coupled to the ends of the U-shaped pipe 41, respectively.

The left support stay 13 is formed by bending a sheet metal in such a manner as to form floor attachment portions 13a, 13a, leg support portions 13b, 13b in both sides thereof and a rod support portion 13c in one of the sides of the stay so formed.

The right support stay 14 is formed by bending a sheet metal in such a manner as to form floor attachment portions 14a, 14a and leg portion support portions 14b, 14b in both sides of the stay so formed.

The seat leg 15 is constructed by rotatably attaching one end 45a of a left leg 45 to the left seat leg support portion 32, rotatably attaching the other end 45b of the left leg 45 to the left support stay 13, rotatably attaching one end 46a of a right leg 46 to the right seat leg support portion 33, rotatably attaching the other end 46b of the right leg 46 to the right support stay 14, and connecting the left leg 45 and right leg 46 with a lateral pipe 47.

Figure 3:
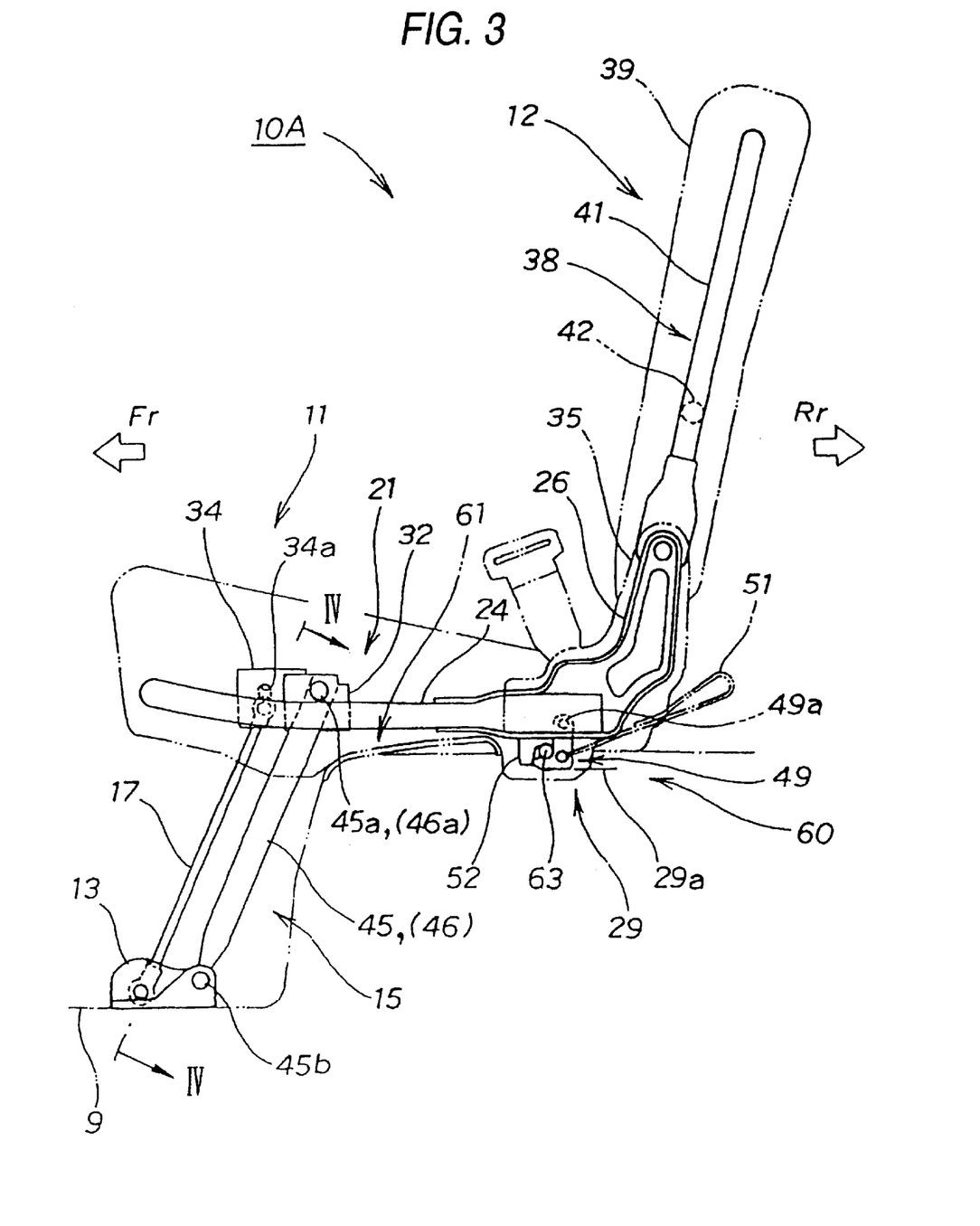
FIG. 3 is a drawing as viewed indicated by an arrow III of FIG. 2.

FIG. 3 is a drawing as viewed in a direction designated by an arrow III in FIG. 2 and shows a side view of the rear seat.

The hook 29 includes a hook main body 49, a release belt 51 attached to the hook main body 49 and a metal receiving member 52 adapted to abut against an upper portion of a hook retaining member 63 as a locking means, which will be described later. In the rear seat 10A, the hook main body 49 is released from the hook retaining member 63 by pulling the release belt 51 toward the rear of the rear seat 10A.

In addition, reference numeral 29a denotes a lower end of the hook 29, and reference numeral 49a denotes a fulcrum of the hook main body 49.

The rod support portion 34 is provided with an elongated hole 34a adapted to be fitted over the rod 17 and is intended to restrict the rotation of the seat cushion about the ends 45a, (46a) of the left and right legs 45, (46) within a certain range.

Figure 4:
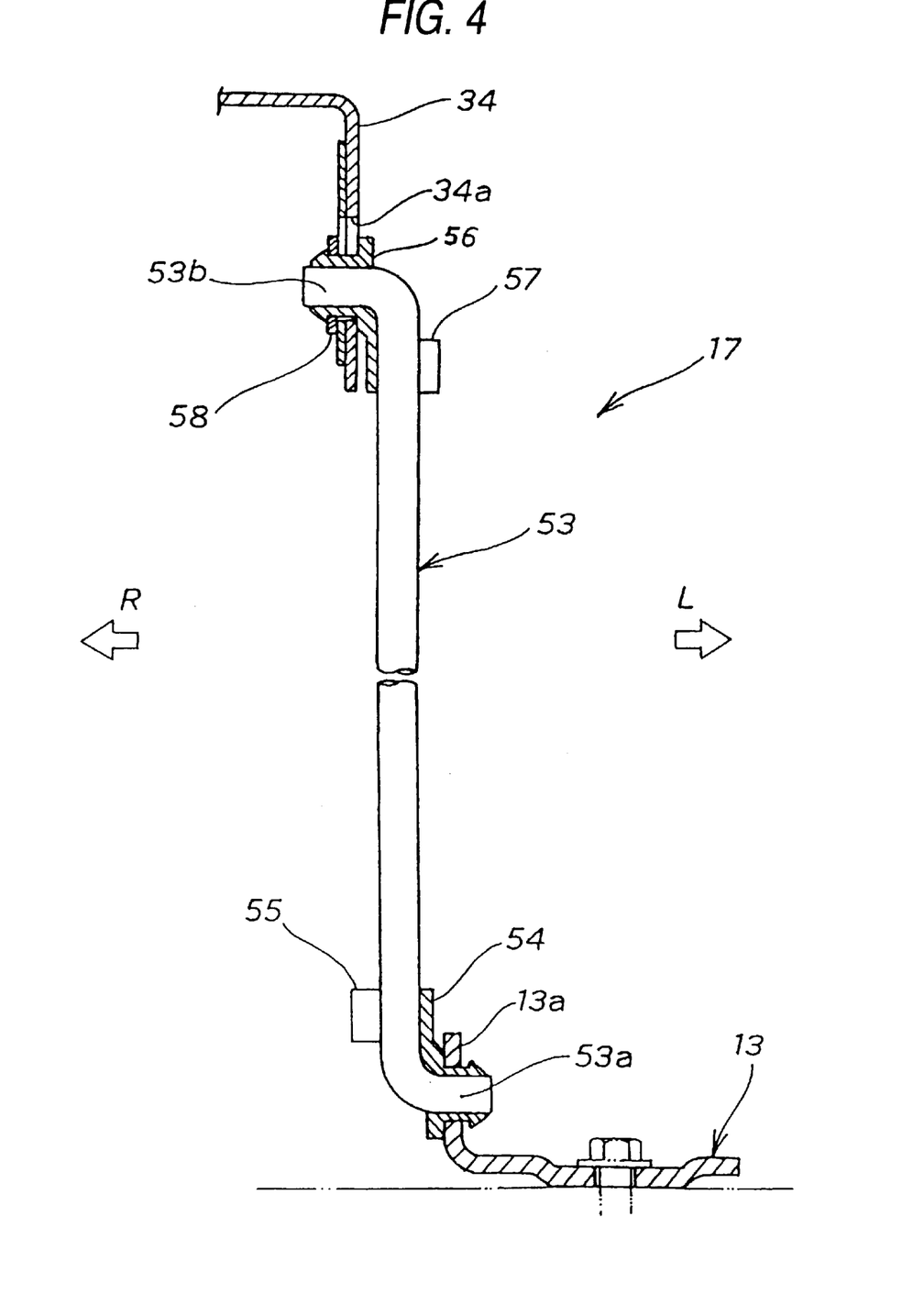
FIG. 4 is a cross-sectional view taken along the line IV—IV of FIG. 3.

FIG. 4 is a cross-sectional view taken along the line IV—IV of FIG. 3 and shows a configuration of the rod as viewed from the front thereof.

The rod 17 includes a rod main body 53, a floor side rod holder 54 into which one end portion 53a of the rod main body 53 is inserted, a fixing member 55 for fixing the floor side rod holder 54 to the rod main body 53, a seat side rod holder 56 into which the other end portion 53b of the rod main body 53 is inserted and a fixing member 57 for fixing the seat side rod holder 56 to the rod main body 53.

Reference numeral 58 denotes a washer interposed between the elongated hole 34a of the rod support member 34 and the seat side rod holder 56.

Figure 5:
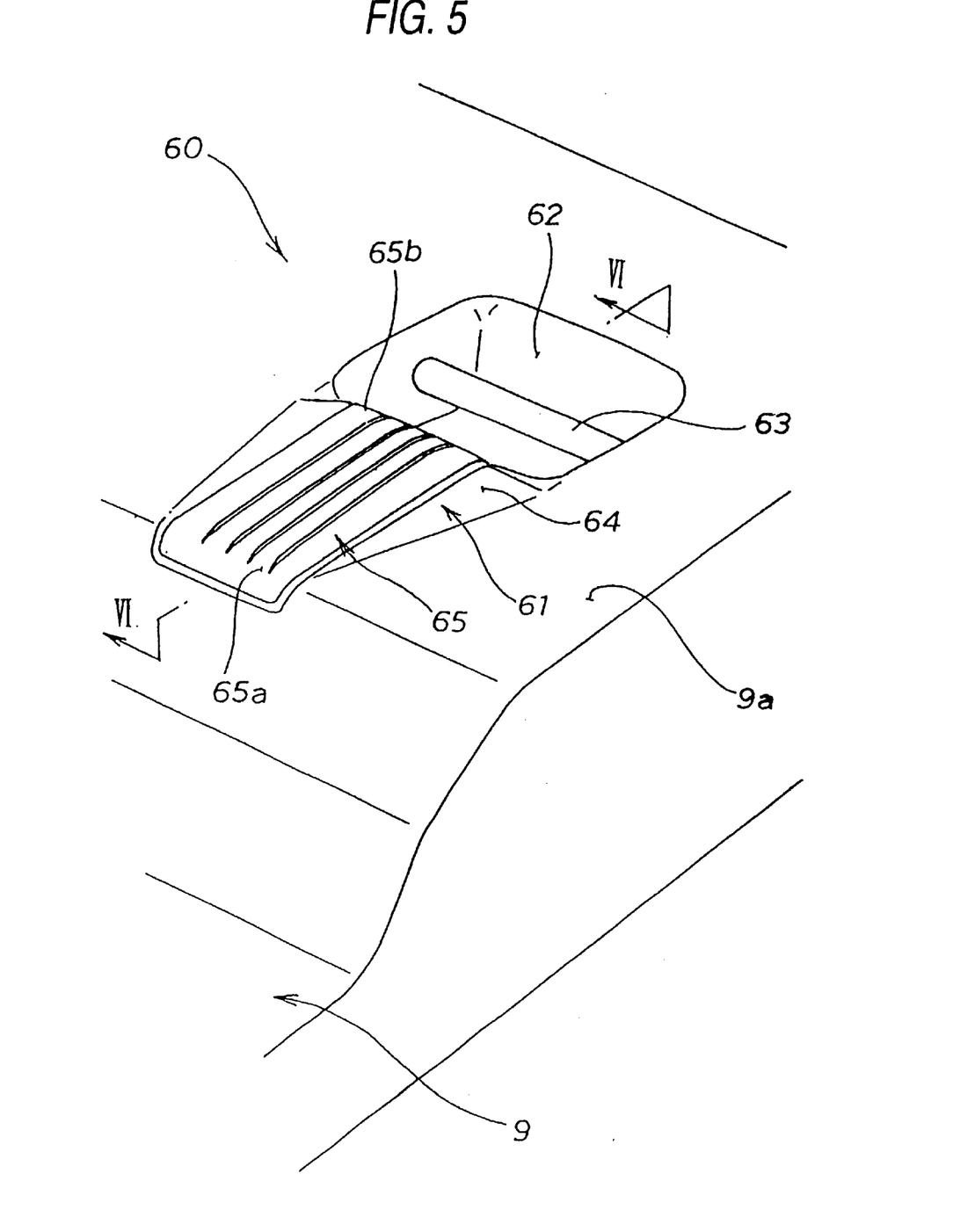
FIG. 5 is a drawing showing a rear seat supporting structure of the vehicular seat according to the present invention.

FIG. 5 is a perspective view of a vehicle rear seat supporting structure according to the present invention.

A rear seat supporting structure 60 is constructed by forming on the floor 9 a stepped portion 9a which is elevated from the floor to a certain height, forming an inclined surface 61 on the stepped portion 9a, forming a recessed portion 62 for receiving therein the hook 29 (refer to FIG. 3)

rearward of the inclined surface 61 in the stepped portion 9a, and forming the hook retaining member 63 in the recessed portion 62.

The inclined surface 61 is constructed by forming a tapered raised portion 64 on the stepped portion 9a and placing a slide assisting member 65 over the tapered raised portion 64.

Figure 6:
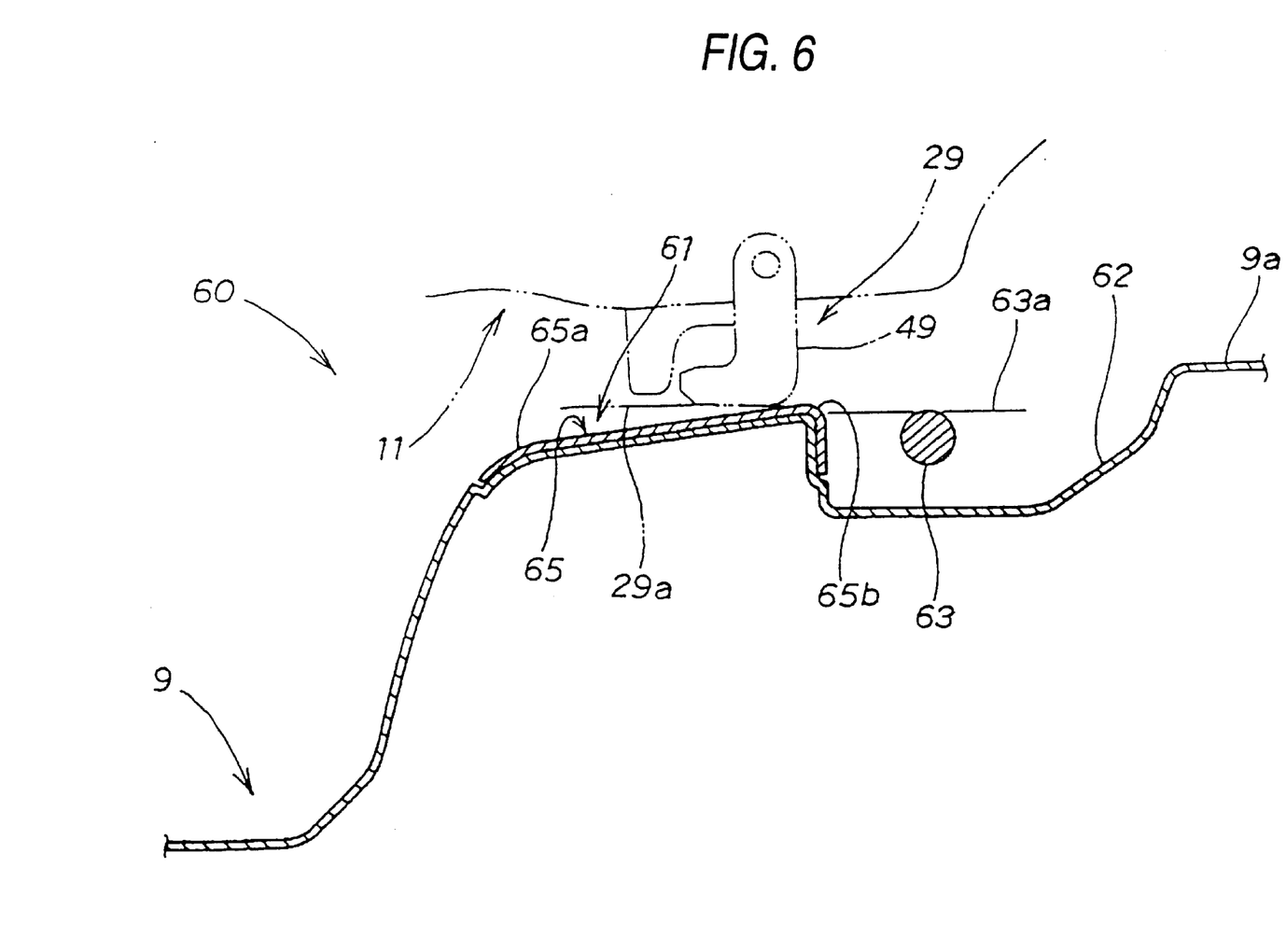
FIG. 6 is a cross-sectional view taken along the line VI—VI of FIG. 5.

FIG. 6 is a cross-sectional view taken along the line VI—VI of FIG. 5 and shows a cross-sectional configuration of the slide assisting member 65 and the recessed portion 62.

The inclined surface 61 and the lower end of the hook 29 is caused to substantially match the upper surface 63a of the hook retaining member 63 in height.

The slide assisting member 65 is a plate-like member for reducing the sliding friction and has a curved surface portion 65a formed at one end thereof for guiding the hook 29 and a corner portion 65b formed at the other end thereof for guiding the hook 29. Referring to FIGS. 7A to 9B, an operation of the rear seat 10A described heretofore will be described.

Figure 7A:
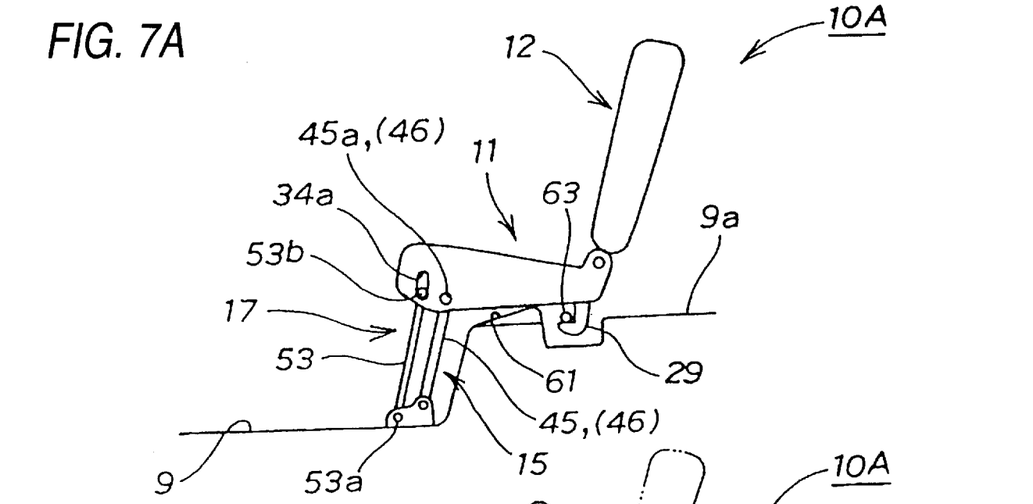
FIGS. 7A to 7C are drawings describing a first operation of the vehicular seat according to the present invention.
Figures 7B, 7C:
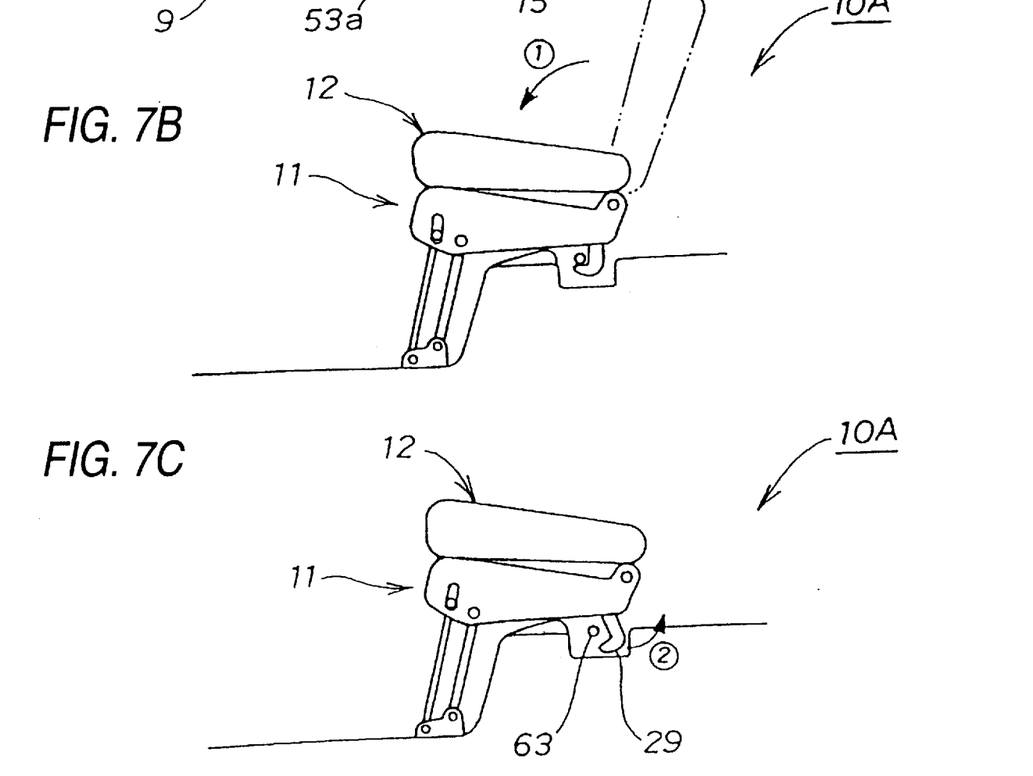

FIGS. 7A to 7C are drawings describing a first operation of the vehicular seat according to the present invention and show side views of the rear seat 10A.

The rear seat 10A shown in FIG. 7A is in an in-use state in which the seat back 12 is erected and the hook 29 is hooked on the hook retaining member 63.

In FIG. 7B, the seat back 12 is folded down toward the seat cushion 11 as indicated by an arrow ①.

In FIG. 7C, the hook 29 is released from the hook retaining member 63 as indicated by an arrow ②.

Figure 8A:
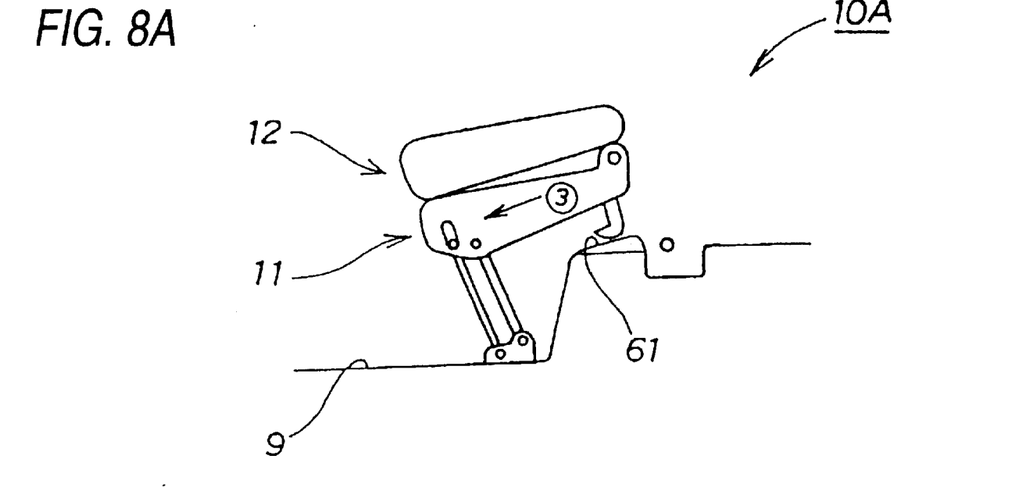
FIGS. 8A to 8C are drawings describing a second operation f the vehicular seat according to the present invention.
Figure 8B:
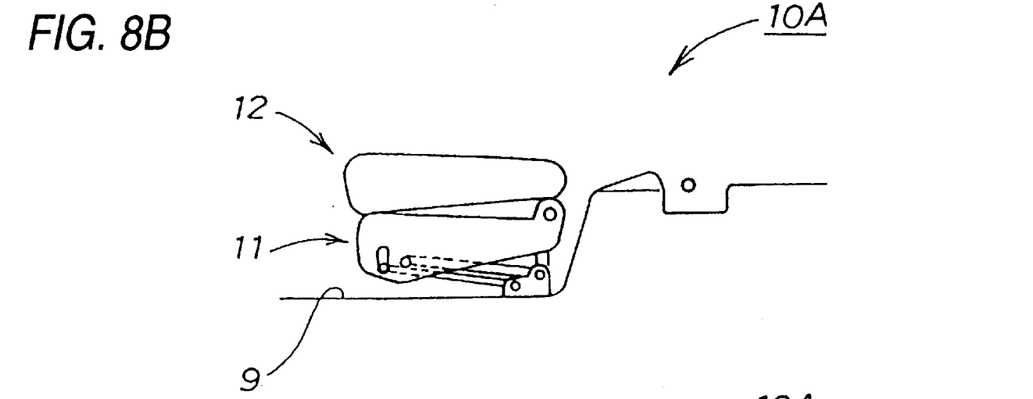
Figure 8C:
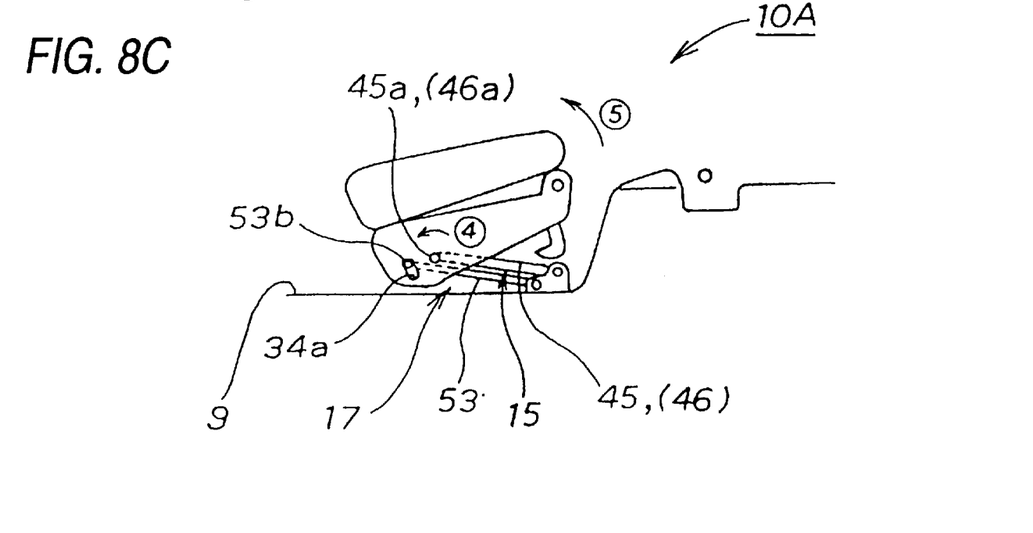

FIGS. 8A to 8C are drawings describing a second operation of the vehicular seat according to the present invention and show side views of the rear seat 10A.

In FIG. 8A, the folded rear seat 10A is slid along the inclined surface 61 so as to start a movement toward the floor 9 as indicated by an arrow ③.

FIG. 8B shows a received state of the folded rear seat 10A and shows a posture in which the folded rear seat 10A has already been received in the floor 9.

In FIG. 8C, for instance, when the rear seat 10A tries to rotate by virtue of the action of inertia about the one ends 45, (46) of the left and right legs 45, (46) as indicated by arrows ④, ⑤, the other end 53b of the rod main body 53 is regulated by the elongated hole 34a, and the rear seat 10A is prevented from rotating more than required.

In addition, since the rear seat 10A is not intended to be fixed to the floor 9 side for restraining the rotation of the rear seat 10A, a transition movement can be performed continuously from an in-use state to a received state, or from a received state to an in-use state. Consequently, it is possible to improve the convenience in utilization of the rear seat 10A.

Figure 9A:
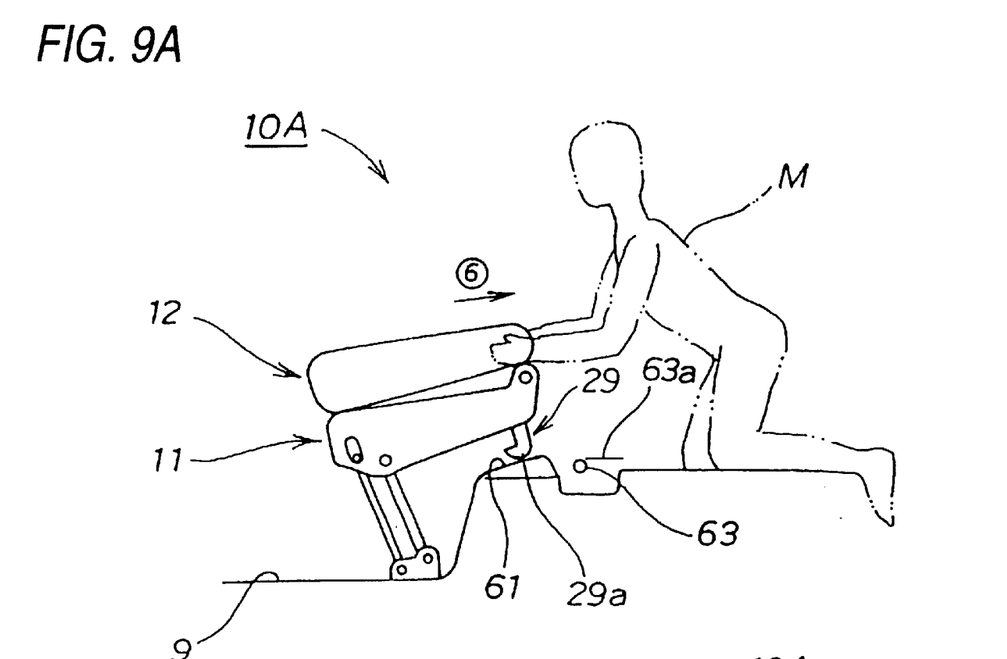
FIGS. 9A and 9B are drawings describing a third operation of the vehicular seat according to the present invention.
Figure 9B:
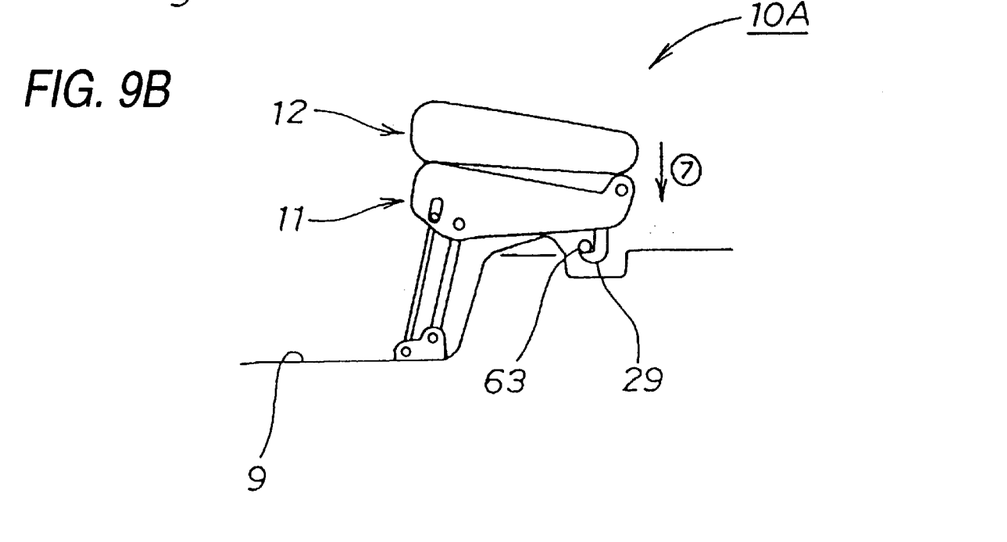

FIGS. 9A and 9B are drawings describing a third operation of the vehicular seat according to the present invention and show side views of the rear seat 10A.

In FIG. 9A, the rear seat 10A is pulled as indicated by an arrow ⑥, while being lifted up. Since the inclined surface 61 is provided which allows the lower end of the hook 29 to substantially match in height the upper surface 63a of the hook retaining member 63 when the rear seat 10A is returned from a received state to an in-use state, the rear seat 10A is easy to be returned from the received state to the in-use state and the hook 29 can securely be hooked on the hook retaining member 63. Reference character M denotes an operator.

In FIG. 9B, the rear seat 10A is lowered as indicated by an arrow ⑦, and the hook 29 is hooked on the hook retaining member 63.

In the above embodiment, as shown in FIG. 3, the inclined surface 61 is set higher than the upper surface of the hook retaining member 63 as a locking means with the lower end of the hook being substantially matched to the upper surface of the hook retaining surface, but the inclined surface is not necessarily set higher than the upper surface of the locking means, and the inclined surface may be formed in any way, provided that the lower end of the hook substantially matches in height the upper surface of the locking means.

Further, in the embodiment, as shown in FIG. 2, the rod 17 acting as the rotation restraining member is disposed substantially in parallel with the seat leg 15 acting as the link, but they are not necessarily be disposed substantially in parallel with each other, and the seat leg 15 may not be in parallel with the link. In addition, the rotation restraining member is disposed before the link, but the member is not necessarily disposed therebefore, and the rotation restraining member may be provided rearward of the link.

With the aforesaid construction, the present invention exhibits the following effectiveness.

According to the present invention, since the vehicular seat is adapted to be lowered by its own weight when it is returned from a received state to an in-use state after it is pulled rearward while allowing it to slide along the inclined surface at the lower end of the hook to thereby permit the hook to be hooked on the locking means, there is needed no work to lift up the vehicular seat and then lower the same, this facilitating the hooking of the hook on the locking means, thereby making it possible to improve the convenience in utilization of the vehicular seat. In addition, the vehicular seat can securely be fixed to the floor side without a risk of erroneous judgement on the hooking of the hook on the locking means.

In addition, the rotation restraining member is provided so as to extend between the floor and the frame for restraining the vehicular seat, which is put in the received state from the in-use state, from rotating about the one end of the link by virtue of the action of inertia. Consequently, since only the rotation restraining member is provided so as to extend between the floor and the seat frame, the vehicular seat can be returned from the received state to the in-use state without releasing this rotation restraining member, thereby making it possible to improve the convenience in utilization of the vehicular seat.

While only certain embodiments of the invention have been specifically described herein, it will apparent that numerous modifications may be made thereto without departing from the spirit and scope of the invention.

The present disclosure relates to the subject matter contained in Japanese patent application Nos. Hei.10-283106 filed on Oct. 5, 1998 and Hei.10-283107 filed on Oct. 5, 1998 which are expressly incorporated herein by reference in its entirety.

What is claimed is:

1. A vehicular seat, comprising:
   a seat frame;
   a link rotatably fixed to a car floor at one end thereof and connected to said seat frame at the other end thereof so that the vehicular seat is changed between an in-use state and a received state by guidance of said link; and
   a rotation restraining member provided to extend between the car floor and said seat frame, for restraining said vehicular seat, which has reached the received state from the in-use state, from further rotating about said link due to inertia, wherein said rotation restraining member is constructed by a rod member connecting said seat frame to the car floor, and wherein said rod member is disposed substantially in parallel with said link.

2. A vehicular seat, comprising:

a seat frame;

a link rotatably fixed to a car floor at one end thereof and connected to said seat frame at the other end thereof so that the vehicular seat is changed between an in-use state and a received state by guidance of said link;

a rotation restraining member provided to extend between the car floor and said seat frame, for restraining said vehicular seat, which has reached the received state from the in-use state, from further rotating about said link due to inertia;

a locking means provided on a floor side;

a hook provided on a seat frame side for fitting to said locking means in the in-use state; and an inclined surface provided on the floor side which allows a lower end of said hook to slide on said inclined surface to be matched substantially to a height of an upper surface of said locking means, for facilitating engagement of said hook with said locking means when said vehicular seat is returned from the received state to the in-use state.

3. A vehicular seat, comprising:

a link connecting a seat frame to a car floor so as to change the vehicular seat between an in-use state and a received state;

a locking means provided on a floor side;

a hook provided on a seat frame side for fitting to said locking means in the in-use state; and an inclined surface provided on the floor side which allows a lower end of said hook to slide on said inclined surface to be matched substantially to a height of an upper surface of said locking means, for facilitating engagement of said hook with said locking means when said vehicular seat is returned from the received state to the in-use state.

4. A vehicular seat changeable between an in-use state and a received state, said vehicular seat structure comprising:

a seat frame disposed on an upper surface of a stepped portion of a car floor in the in-use state;

a link member rotatably supported to a lower surface of the stepped portion of the car floor and connected to said seat frame at one end thereof, said link member and said seat frame being folded in the received state in such a manner that said seat frame is disposed on the lower surface of the car floor;

a rotation restraining member pivotally connected between the lower surface of the car floor and said seat frame, for restraining the vehicular seat in the received state from rotating around said one end of said link member.

5. A vehicular seat according to claim 4, wherein said rotation restraining member is constructed by a rod member, and said rod member is pivoted in conjunction with said link member when said vehicular seat is changed from the in-use state to the received state.

6. A vehicular seat according to claim 4, further comprising:

a locking unit provided on the upper surface of the car floor;

a hook provided on said seat frame so as to fit with said locking unit in the in-use state; and an inclined surface provided on the upper surface of the car floor and forward of said locking unit to increase a height thereof toward a rear of a vehicle, a top portion of said inclined surface being equal to or higher than an upper surface of said locking unit.

* * * * *